United States Patent [19]
Agrawal

[11] Patent Number: 5,854,909
[45] Date of Patent: Dec. 29, 1998

[54] TEST AND CONTROL ACCESS ARCHITECTURE FOR AN INTEGRATED CIRCUIT

[75] Inventor: Sumeet Agrawal, Beaverton, Oreg.

[73] Assignee: Intel Corporation, Santa Clara, Calif.

[21] Appl. No.: 535,979

[22] Filed: Sep. 29, 1995

[51] Int. Cl.⁶ .............................. G06F 13/38; G06F 15/00
[52] U.S. Cl. ..................... 395/309; 395/838; 395/800.33
[58] Field of Search .................... 395/308, 309, 395/310, 311, 835, 838, 200.54, 800.29, 800.33

[56] References Cited

U.S. PATENT DOCUMENTS

| | | | |
|---|---|---|---|
| 4,839,795 | 6/1989 | Iwaksaki | 364/200 |
| 5,303,354 | 4/1994 | Higuchi et al. | 395/325 |
| 5,331,315 | 7/1994 | Crosetto | 340/825.02 |
| 5,361,338 | 11/1994 | Kobayashi et al. . | |
| 5,367,646 | 11/1994 | Pardillos et al. | 395/325 |
| 5,383,137 | 1/1995 | Burch . | |
| 5,384,722 | 1/1995 | Dulong . | |
| 5,420,696 | 5/1995 | Wegeng et al. . | |
| 5,428,750 | 6/1995 | Hsieh et al. | 395/725 |
| 5,428,800 | 6/1995 | Hsieh et al. | 395/775 |
| 5,430,762 | 7/1995 | Vijeh et al. . | |
| 5,430,862 | 7/1995 | Smith et al. . | |
| 5,436,617 | 7/1995 | Adams et al. . | |
| 5,497,466 | 3/1996 | Roden et al. | 395/506 |
| 5,564,061 | 10/1996 | Davies et al. | 395/884 |
| 5,568,617 | 10/1996 | Kametani | 395/280 |
| 5,623,611 | 4/1997 | Matsukawa et al. | 395/309 |
| 5,625,780 | 4/1997 | Hsieh et al. | 395/311 |
| 5,640,521 | 6/1997 | Whetsel | 395/311 |

*Primary Examiner*—Mark H. Rinehart
*Attorney, Agent, or Firm*—Blakely, Sokoloff, Taylor & Zafman

[57] ABSTRACT

A data processing apparatus having a bidirectional bus circuit is provided. The data processing apparatus further includes a central logic unit and a plurality of peripheral logic units. The bidirectional bus circuit includes a plurality of bus lines for coupling the central logic unit to the peripheral logic units. Moreover, the bidirectional bus circuit includes a plurality of bidirectional data repeaters. Each of the repeaters have a plurality of data ports, wherein one of the ports is coupled to one peripheral logic unit cluster. The bidirectional data repeaters further include peripheral branch identification circuits for receiving a peripheral identification signal from the central logic unit and for generating a directioning signal responsive to the peripheral identification signal. The bidirectional data repeater further includes a directioning circuit for coupling to the data ports and to the identification means and for receiving data from one port and transmitting the data to at least another port responsive to the directioning signal.

19 Claims, 5 Drawing Sheets

TEST AND CONTROL ACCESS ARCHITECTURE FOR AN INTEGRATED CIRCUIT

BACKGROUND OF THE INVENTION (1) Field of the Invention

This invention generally relates to microprocessors. More specifically, the present invention relates to a control register unit and to control registers coupled to the control register unit in a microprocessor.

(2) Description of Related Art

In many central processing units, an Address Generation Unit (AGU) is used to perform address calculations, handle segment operations, and control accesses to all control/test registers. Additionally, the Address Generation Unit may contain a Control Register Unit (CRU), coupled to control registers which are generally located over the entire area of a chip. Control registers are different from the architectural registers of the chip in control registers need to store information which generally does not change very often. These registers are used for testing and debugging the microprocessor besides being used in conjunction with the functionality of the chip. For example, a control register can be used to store a system privilege level. A privilege level can be set to exclude users or a segment of potential users from using certain features which are on the chip. Generally, a status of the privilege level can be stored in a control register. A change in the privilege level could be performed by doing a write operation to this control register. Besides such usage for functionality, control registers can be used for testing data. For example, upon sending the control signals to a certain unit located on the chip, a test control register can be programmed to capture an address to be tested.

The Control Register Unit may be coupled via a control register bus to various control registers residing in units located on the chip. Due to the fact that control registers can be positioned in almost every unit of the chip, a control register bus would have to be routed over the entire surface of the chip. The control register bus, thus, may be one of the largest busses on a chip. Data flowing through such a large bus, however, may be distorted before reaching its destination due to signal losses occurring along the bus. Drivers or repeaters are needed to regenerate the signal along the bus to ensure accurate transmission of data. Because, the control register bus may have multiple branches, more than one driver is typically needed.

Moreover, in certain implementations, it might be advantageous to have a bidirectional control register bus. Such a bidirectional bus could be used, for example, if one desires to perform both read and write operations via the same bus. The design of such bidirectional bus would be complicated due to the fact that the repeater drivers would have to be bidirectional. If more than one bidirectional driver is included with a control register bus having multiple branches, a clash of data on the bus may occur if more than one bidirectional drivers would be driving data from the control registers to the Control Register Unit.

Accordingly, it is desirable to have a bidirectional bus that connects a Control Register Unit to control registers located over the entire area of a chip. It is also desirable to have one or more bidirectional repeaters, coupled along the bus between the Control Register Unit and several control registers. Furthermore, it is desirable to provide a mechanism for bidirectionally driving such a bus. It is also desirable to provide an integrated mechanism for performing read and write operations in a pipelined fashion, both on the same control bus. It is also desirable to have an integrated control register architecture for providing both testability and functionality.

SUMMARY OF THE INVENTION

The present invention provides a microprocessor that has a bidirectional bus circuit, a central logic unit, and a plurality of peripheral logic units. The bidirectional bus circuit includes a plurality of bus lines to couple the central logic unit to the peripheral logic units. The bidirectional bus circuit also includes a plurality of bidirectional data repeaters. Each data repeater has a plurality of data ports to couple to the bus lines. One of the data ports is coupled to one peripheral logic unit. The repeater further includes a peripheral cluster identification circuit to receive a peripheral identification signal from the central logic unit and to generate a directioning signal responsive to the peripheral identification signal. The repeater also includes a directioning circuit to couple to the data ports and to the peripheral cluster identification circuit, and to receive data from one data port and to transmit the data to at least another data port in response to the directioning signal.

BRIEF DESCRIPTION OF THE DRAWINGS

The features, aspects, and advantages of the present invention will become more fully apparent from the following detailed description, appended claims, and accompanying drawings in which:

DETAILED DESCRIPTION OF THE INVENTION

In the following description, numerous specific detail are set forth to provide a thorough understanding of the present invention. However, one having ordinary skills in the art may be able to practice the invention without the specific details. In some instances, well-known circuits, structures and techniques have not been shown in detail not to unnecessarily obscure the present invention.

The present invention provides for an integrated pipelined mechanism for performing both read and write operations on a bidirectional bus having bidirectional repeaters. The present invention also offers an integrated mechanism for testability and functionality.

Figure 1:
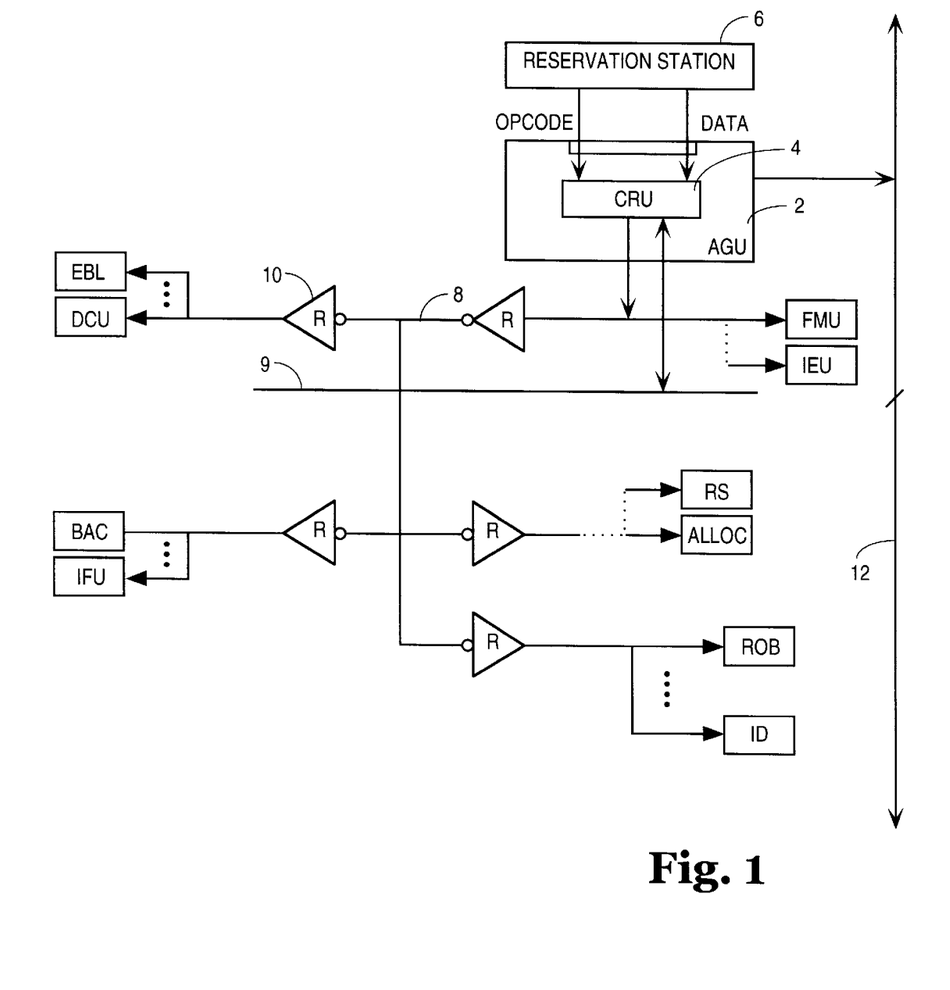
FIG. 1 is a block diagram of the data processing apparatus showing the control register address bus connected between the central logical unit and the peripheral logical units.

FIG. 1 shows Address Generation Unit 2 coupled to a plurality of peripheral logic units. The coupling to the several peripheral logic units illustrated in this figure is done via the control register address and data bus circuits of the present invention. As explained above, the Address Generation Unit (AGU) is responsible for performing address calculations, handling segment operations, and controlling accesses to all control registers. Additionally, the AGU contains a Control Register Unit (CRU) 4, which controls the control registers of the AGU and also controls read and write operations to the various control registers (not shown) positioned in the various peripheral logic units located on the whole chip. The Control Register Unit interfaces between the Address Generation Unit and the control registers.

Control register accesses, according to the present invention, are performed by the CRU in the following way. The CRU receives input data from the Reservation Station (RS) 6 in the form of micro-operations (UOPS) and data. For reading from control registers, the CRU drives the address and read control signals via the control register address bus 8 and repeaters 10 to the peripheral logic units. In turn, the peripheral logic unit, containing the control register addressed, drives the control register data bus with data from the respective register. This data is then collected by the CRU and written to the writeback bus 12. For writing to control registers, the CRU provides data from the Reservation Unit (RS) 6 to the control register data bus 9. This data is then collected by the appropriate unit and written to the control register. For broadcasting, the AGU reads the broadcast data either from the RS or from one of the AGU control registers and broadcasts it over the control register data bus to the respective units to which broadcasting is desired.

The control register address bus 8, generally, extends over the entire chip and connects the CRU to the peripheral logic units, which can also contain control registers. Every control register has a unique address in a predefined address space. The control register unit (CRU) sends out a nine bit address through the control register address bus 8 to all the control registers located on the chip. Each of the peripheral logic units to which the address is sent has a control unit (not shown) which decodes the address and then detects which of the control registers found in the respective unit is addressed. Along with the control register address bus runs a read/write control register bus (not shown). The read/write control register bus carries a signal which after decoding indicates to the addressed control register, located in the respective unit, what operation is being performed in connection with the addressed control register.

The Address Generation Unit, according to the present invention, is considered to be an execution unit and, thus, follows the 33-34-35 pipe stage numbering convention for generation of addresses. Moreover, the AGU communicates with the control registers, located in the various units of the microprocessor, by using a read/write pipelining according to the present invention. The read/write pipelined mechanism of the present invention will be explained later in this section.

Figure 2:
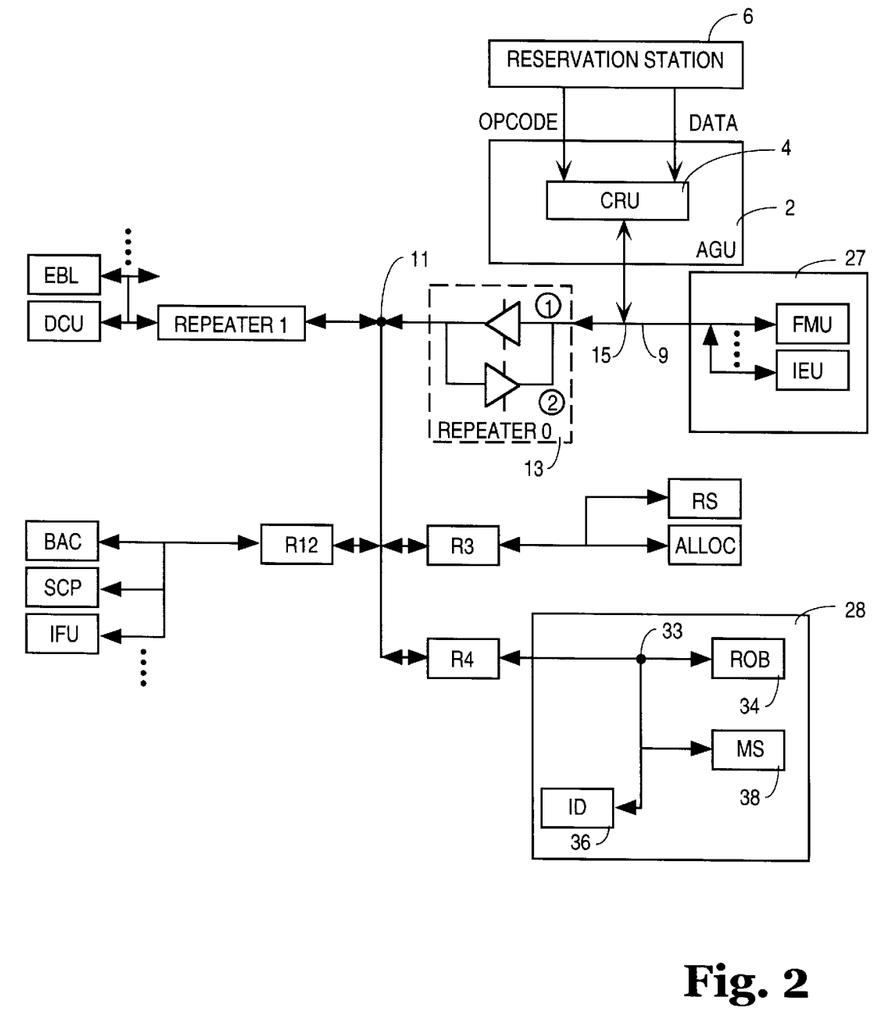
FIG. 2 illustrates a data processing apparatus, according to the present invention, having the central logic unit connected to peripheral logic units via the control register data bus.

FIG. 2 shows a bidirectional control register data bus circuit 9, according to the present invention, linking the control register unit (CRU) 4 to one or more peripheral logic units, groups of peripheral logic units are coupled to a common node of the data bus. The common node is further coupled to the CRU via the bidirectional bus according to the present invention. In this Figure, one group of peripheral logic units is 34, 36, and 38 coupled to node 33. The bidirectional data bus 9 is routed, along the data processing apparatus of the present invention, to at least one peripheral logic unit group. With the exception of peripheral logic unit group 27 the bidirectional data repeater 13 couples the CRU to all the peripheral logic unit clusters on the chip. Each such cluster, except 27, is thus coupled to repeater 13 via central node 11. Cluster 27, however, is coupled directly to the CRU 4 because of its proximity to the CRU.

Central logic unit 4 is thus coupled via control register data bus circuit 9 to all the peripheral logic units containing control registers. As explained above, due to signal losses, a bus circuit, such as the control register data bus circuit 9, which is routed over a very long path, needs drivers coupled thereto to regenerate the signal sent along the bus. The drivers coupled to a bidirectional bus need also to be bidirectional. Coupling bidirectional repeaters along a bidirectional bus, however, is problematic because the repeaters would need to know in which direction to drive data on the bus to prevent collision of data on the bus. The apparatus and method according to the present invention provide for intelligent repeaters that can direct data in a certain direction, depending on whether the addressed control register resides or does not reside in the peripheral logic unit cluster directly coupled to the repeater. The functioning of the bidirectional repeaters according to the present invention is explained below.

Figure 3:
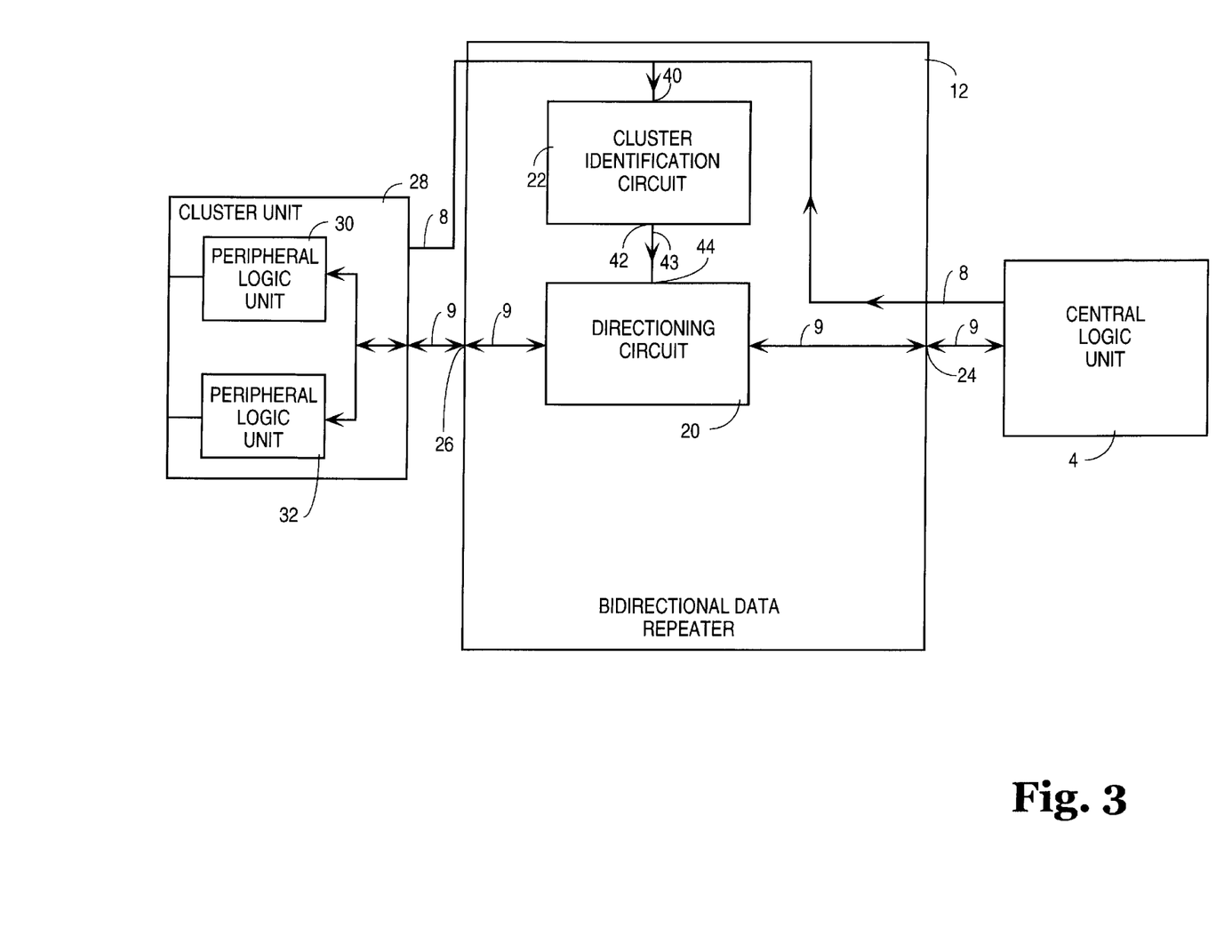
FIG. 3 is a bidirectional data repeater, according to the present invention, connected to the central logic unit and one or more to a peripheral logic unit.

FIG. 3 illustrates a central logic unit 4, coupled via bidirectional bus 9 to port 24 of bidirectional data or repeater 12. The central logic unit 4, by way of non-limiting example, can be the Control Register Unit. Port 24 can be considered either an input or an output port, depending on what unit is driving the control register data bus. If central logic unit 4 is driving the data bus, then port 24 is considered an input bus. If, however, a peripheral logic unit, such as 30 is driving the bus, then port 24 is considered an output port. Each peripheral logic unit receives the address and the control read/write signals via the control register address bus 8. Typically, each peripheral logic unit includes a decoder (not shown in this figure) which determines whether a control register located in the particular peripheral logic unit is addressed. If a read operation is desired, then the peripheral logic unit which contains the addressed control register drives the bus with information contained in the control register. In such case, bidirectional data repeater 12 will receive the information stored in the addressed control register via port 26. In view of the fact that more than one peripheral logic unit cluster may be coupled to the central logic unit 4, data from more than one such cluster can be latched onto the bidirectional bus circuit 9 at the same time, if more than one bidirectional data repeater 12 was set for receiving data through data port 26 and transmitting data to data port 24. This would cause contention on the bus circuitry.

In order to solve this problem, the bidirectional data repeaters of the present invention are provided with a mechanism which can detect whether the addressed register is located in a peripheral logic unit which belongs to a cluster directly coupled to the repeater. This mechanism includes cluster identification circuit 22 and directioning circuit 20. In the preferred embodiment, according to the present invention, the control register address bus 8 is coupled between the central logic unit 4, cluster identification circuit 22, and cluster 28. Address and control signals are sent onto the address bus to the peripheral logic units via the cluster identification circuit 40. The cluster identification circuit will receive the address and the control signals at input gate 40, and in response to these signals, it will generate a directioning signal at gate 42. The directioning signal is coupled to gate 44 of the directioning unit 20 via bus 43. Based on the directioning signal, the directioning circuit can turn itself into a mode where data is transmitted from port 24 to port 26, or vice versa. Typically, the directioning unit contains a bidirectional tristate driver, which can be enabled in one direction or another, depending on the directioning signal received at gate 44. In this particular embodiment, if a determination is made by the branch identification unit 40 that a control register is found in a peripheral logic unit included in a cluster directly coupled to the repeater 12, and a read operation is desired, the directioning unit will enable the transfer of data from gate 26 to gate 24. Data can thus be read from the addressed control register by the central logical unit 4.

By contrast, if the cluster identification circuit 40 determines that the control register addressed by central logic unit 4 is not located within any of the peripheral logic units directly coupled to bidirectional data repeater 12, then the cluster identification circuit 40 will send a directioning signal to the directioning circuit 20. This signal will cause directioning circuit 20 to switch itself into a write mode. In the write mode, the bidirectional repeater 12 will transmit data in the direction of the cluster directly coupled thereto, i.e., from data port 24 to data port 26. In this case, only one bidirectional data repeater will be transmitting data to the central logic unit. 4

Figure 4:
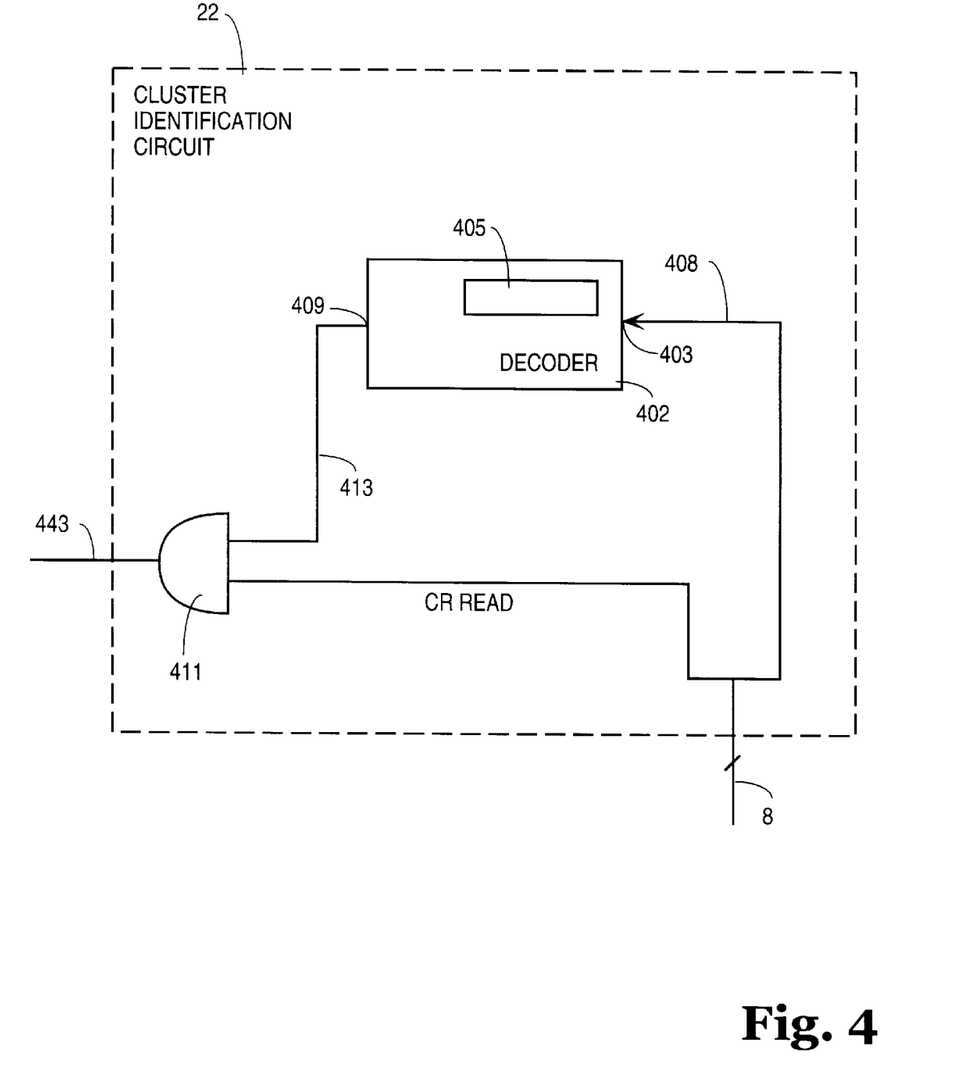
FIG. 4 illustrates the peripheral cluster identification circuit of the bidirectional data repeater.

FIG. 4 illustrates the structure of cluster identification circuit 40. The cluster identification circuit typically can contain a decoder 402 which contains the predetermined address space of the cluster of peripheral logic units serviced by the repeater. The cluster address space is basically a segment of the total address space of the control set of the CRU. This segment is common to all the control registers included in the peripheral logic units which are part of the cluster directly coupled to a repeater. Consequently, when the address of a certain control register is sent via the address bus 8 to the cluster identification circuit 40, the cluster identification unit can determine whether the address of the control register is part of the predetermined address space of the cluster coupled to that repeater by the appropriate decoding of the control register address. The decoder 402 is provided with an input gate 403 which is coupled to the bus 408 which forms an address signal sent through address bus 8 of FIG. 3. The decoder 402 includes a storage register 405 which contains a predefined cluster address space. The decoder 402 decodes the address received on bus 408 and compares it with the predefined cluster address space stored in register 405. Depending on the result of this comparison, the decoder 402 issues a signal at the output 409. The signal generated at gate 409 is fed through line 413 to AND gate 411 where this signal is ANDed with the signal control register read (CR read) which indicates that the central logic unit 4, which is the control register unit of FIG. 2, wants to read the content of a control register. Gate 411 issues a directioning signal on line 443 which is the directioning signal received by the directioning circuit 20 of FIG. 3. The cluster identification circuit as shown in FIG. 4 resides inside the perimeter defined by the dotted line. Accordingly, a directioning signal will be sent to the gate of directioning unit 44 indicating in what direction the directioning unit should transmit data.

In the embodiment illustrated in FIG. 2, the control register data bus of the present invention has a tree-like configuration. The control register unit (CRU) 4 is analogous to the root of a tree while the different portions of the bus going to each peripheral logic cluster are equivalent to the branches of a tree. According to this embodiment, only one of the repeaters 12 drives data towards the center node 11 at one time. This is to avoid a clash of data on the bus. In case the repeaters were not adapted to identify whether the respective branch was addressed, a clash of data would occur onto the control register data bus upon the initiation of a read operation, because more than one repeater would be driving the bus.

Cluster 27, which contains the FMU and IEU unit, among other things, is directly connected to the control register unit. More specifically, no repeater is connected between the central register unit and branch unit 27. This is so because this cluster is physically located very close to the CRU.

The central repeater 13 is designed such that it is driving data to CRU only if none of the units included in cluster 27 are driving the bus. Therefore central repeater 13 will be in read mode only when the branch unit containing FMU and IEU are not accessed. However, if these units are accessed, the central repeater will be in the write mode. This makes sure that the central segment is always driven, never left floating, and that it never clashes with data from the cluster 27.

The bidirectional data bus circuit according to the present invention provides support for achieving pipelined reading and writing between the CRU 4 and the control registers. While in the prior art, the read and write operations were performed by using two separate mechanisms, the present invention merges both the read and the write mechanism into a unique protocol which enables pipelining when a bidirectional data bus circuit is used for both reading and writing. The integration of reading, writing, and broadcasting into a new single protocol, according to the present invention, will be explained below in connection with FIG. 5.

Figure 5:
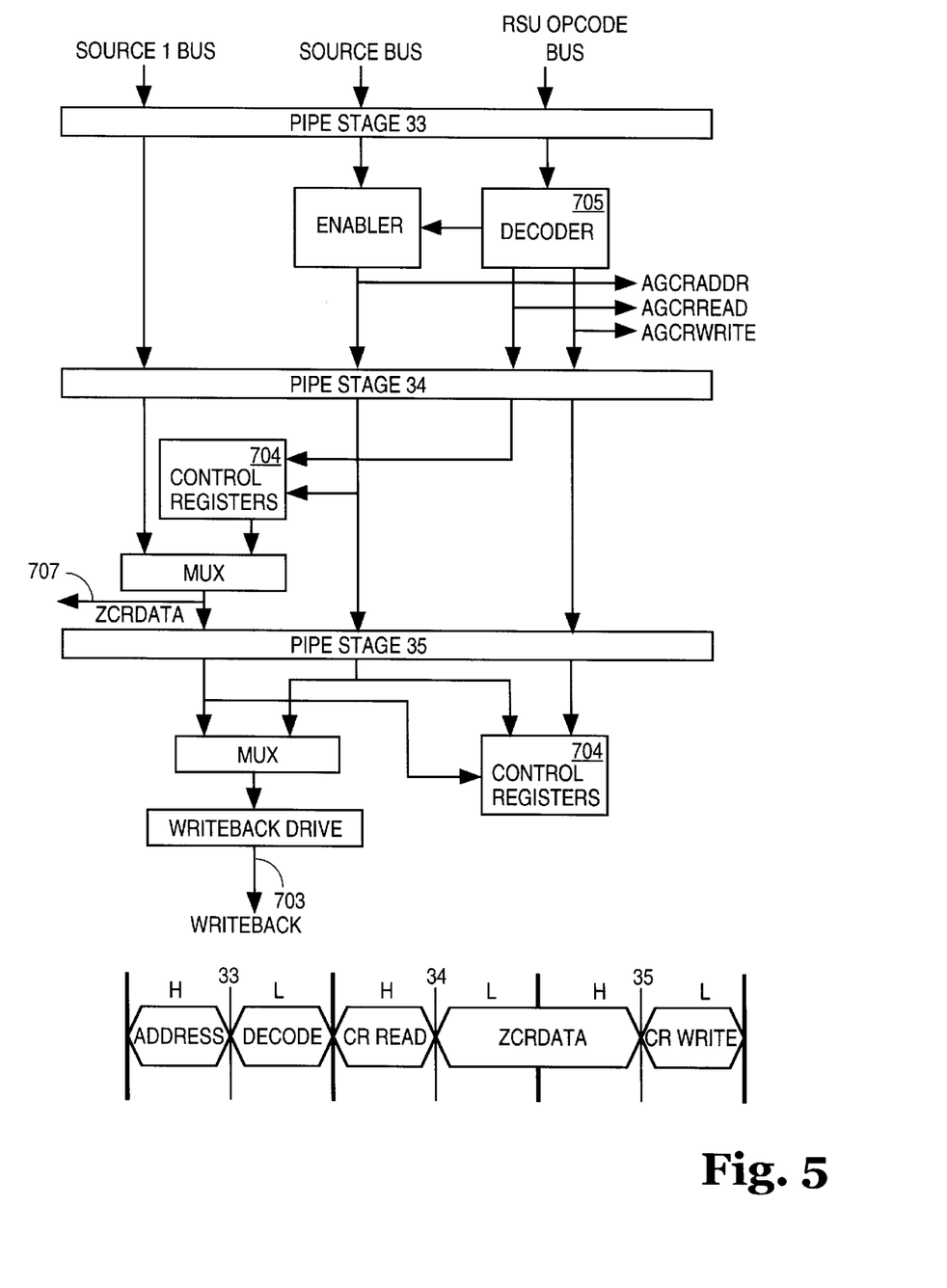
FIG. 5 is a pipeline diagram of the read/write control register protocol, and a functional block diagram of the control logic unit according to the present invention.

FIG. 5 shows the structure and the time diagram of the integrated read/write pipeline of the present invention for read operations. In pipe stage 32, the reservation station RS sends the address and the opcode to CRU via, respectively, source 2 bus and the RSUopCod bus. In pipestage 33H, after opcode decoding, the address and read/write control signals, are sent out on the respective buses to the control registers of the chip. The propagation time of these buses is one phase, so that the address is valid at the end of pipestage phase 33H. In phase 33L, the address is decoded by all units of the chip having access to the control register address bus. The unit whose control register is being addressed sends the data of the addressed control register onto a local bus located inside it in 34H. In cycle 34L, the control register data bus is driven by the respective unit with the data contained in the addressed control register. The control register data bus is a clock active data bus with a propagation delay of one clock. The data is, thus, valid at the control register unit by the end of phase 35H, after which it is latched by this unit and driven from there to the writeback bus. Given this protocol, read operations can be issued back-to-back without any conflicts on the control register busses at all, resulting in fully pipelined operation.

The writing to control registers is pipelined in the following way. In addition to the address on Source 1 and Opcode on RSUopCod bus, the data to be written to the addressed control register comes on Source 1 from the Reservation Station (RS) and is latched by the CRU. As before, the opcode is decoded by a decoder 105, and the address and read/write buses driven by the CRU. In cycle 33L, the units decode the address sent by the CRU to the units. Cycle 34H is not used. In cycle 34L, the CRU drives the data bus with the data on source 2. In cycle 35L, the control register addressed is written into with data sent through the control register data bus. The CRU drives the data written into the control register on the writeback bus. As before, because of the non-conflicting nature of the protocol, full pipelining is allowed. In addition, there is no conflict of data on the CR busses between write-after-read write operations, so that full speed pipelining is allowed for read-after write cases too. This makes the protocol fully pipelined for all read and write operations.

Another operation performed by the CRU is broadcasting. For example, certain control registers on the chip need a copy of the Code Segment Base Segment value, which is stored in the AGU as a control register. The broadcast operation is achieved by reading this control register and then broadcasting it to control registers when required. A special address has been allocated to the control register space which does not address any specific control register, but is recognized by all the registers that need the CS base copy. The RS sends this address on the Source 2 bus. The operation is the same as a control register write, in that multiple peripheral logic units latch the data on the control register data bus and write the control registers with it. The difference is that this operation actually looks like a control register read to the AGU and a write to the other units which get this data. This is achieved through a special microoperation recognized by the AGU.

By combining the read and the write operations as shown in FIG. 5, one can issue a new operation every clock. Even though it takes three clock cycles to finish a read or a write operation, the bidirectional data bus circuit of the present invention and the pipeline mechanism according to the present invention, allow the issuing of new operation each clock, as opposed to three clocks as in the prior art. Accordingly, but for the above-mentioned dependencies, two operations can be performed in 4 clock cycles, as opposed to the prior art where 2 operations would require 6 cycles. In general, the operation throughout is 1 operation per clock, to 1 operation per 3 clocks before. In addition, this includes read and write operations.

The read and write operations, however, cannot be pipelined without observing certain "rules." Certain read/write dependencies, inherent to the control register pipeline, need to be observed, in addition to dependencies imposed by the out-of-order nature of the chip operations. As shown in the pipeline diagram of FIG. 5, read operations from control registers are actually performed in Cycle 34H, and writes in Cycle 35L. Hence, if a read is performed on a control register immediately after it has been written, the actual writing will occur after reading, resulting in spurious data for the read. Therefore, read-after-write to the same register is not permitted in successive clocks. As far as the control register pipeline is concerned, other combinations of operation can be performed in immediate succession.

The current invention ties the test data and control data access architectures into one architecture, alleviating the area overhead of two separate architectures, and providing the capability of interaction between them at no extra cost. For example, a testing operation done through a test control register can access a functional state in another control register without having to deal with interactions between architectures. This can be done through the broadcast operation, for example.

In the foregoing specification, the invention has been described with reference to specific embodiments thereof. The specification and drawings are accordingly to be regarded in an illustrative rather than a restrictive sense. It will however be evident that various modifications and changes can be made thereto without departing from the broader spirit and scope of the invention as set forth in the appended claims.

What is claimed is:

1. A microprocessor having a bidirectional bus circuit, a central logic unit, and a plurality of peripheral logic units, said bidirectional bus circuit comprising:

a plurality of bus lines to couple said central logic unit to said peripheral logic units;

a plurality of bidirectional data repeaters, each of said repeaters having a plurality of data ports to couple to said bus lines, wherein one of said data ports is coupled to one peripheral logic unit, said repeater further including, peripheral cluster identification circuit to receive a peripheral identification signal from said central logic unit and to generate a directioning signal responsive to said peripheral identification signal, and a directioning circuit to couple to said data ports and to said peripheral cluster identification circuit and to receive data from one data port and to transmit said data to at least another data port in response to said directioning signal.

2. The microprocessor of claim 1 wherein said directioning circuit further includes a regeneration circuit for regenerating incoming data.

3. The microprocessor of claim 1 wherein said plurality of bus lines includes a central bus line having first and second ends, said first end being directly coupled to said central logic unit.

4. The microprocessor of claim 1 wherein said plurality of data repeaters includes a central bidirectional data repeater having a central port and a peripheral port, said central repeater being coupled at central port to said second end of said central bus line.

5. The microprocessor of claim 1 wherein said plurality of data repeaters includes at least a repeater having an upstream and a downstream port.

6. The microprocessor of claim 4 wherein said central repeater is coupled at said peripheral port to the upstream port of at least a repeater.

7. The microprocessor of claim 6 wherein said repeater, to which said central port is coupled, further coupled to a branch peripheral unit via said downstream port.

8. The microprocessor of claim 1 wherein said central logic unit has a device for storing an address corresponding to each peripheral logic unit.

9. The microprocessor of claim 8 wherein said peripheral identification signal includes an address of a peripheral logic unit.

10. The microprocessor of claim 9 wherein said peripheral identification signal further includes a segment indicating whether said central control unit is performing a read or a write operation.

11. The microprocessor of claim 2 wherein said peripheral cluster identification circuit includes a circuit for determining whether said address, included in said identification signal, corresponds to a peripheral cluster unit directly coupled to said repeater.

12. The microprocessor of claim 11 wherein, responsive to a determination that said address does not correspond to a peripheral cluster identification unit directly coupled to said repeater, said peripheral cluster identification circuit generates a first directioning signal.

13. The microprocessor of claim 12 wherein, responsive to a determination that said address corresponds to a subunit directly coupled to said repeater, said peripheral cluster identification circuit generates a second directioning signal.

14. The microprocessor of claim 13 wherein said directioning device is adapted for receiving data from said central port of said repeater and transmitting said data to said peripheral port of said repeater in response to said first signal.

15. The microprocessor of claim 14 wherein said directioning device is adapted for receiving data from said central port of said repeater and transmitting said data to said peripheral port of said repeater in response to said second signal.

16. The microprocessor of claim 15 wherein said directioning device includes a bidirectional tristate buffer controllable by said direction signal.

17. The apparatus of claim 12 wherein said peripheral identification cluster circuit includes a memory device with the address of a said repeater.

18. The apparatus of claim 13 wherein said circuit for determining includes a device for extracting from said address of said subunit a repeater segment.

19. A pipelined data processing apparatus having a central logic unit and one or more peripheral logical units, said data processing apparatus comprising:

bidirectional data bus for coupling said central logic unit to said peripheral logic units;

a first pipelined stage, coupled to said bidirectional bus device, said first stage further being coupled to an instruction memory device for storing source instructions, said first stage including a device for fetching and decoding each source instruction stored in said instruction memory device and generating an address signal, a CR read signal, and a CR write signal;

a second pipelined stage, coupled to said first pipeline stage, said second pipelined stage having a device for coupling said CR read signal onto a data bus, first multiplexer for selecting between a control register data and source 1 data, said second pipelined stage further having means for generating a control register read signal a third pipelined stage having means for coupling a CR write to said data bus and write control register signal to an address bus.

* * * * *